United States Patent
Chae et al.

(10) Patent No.: US 12,051,836 B2
(45) Date of Patent: Jul. 30, 2024

(54) ELECTROLYTE MEMBRANE FOR MEMBRANE-ELECTRODE ASSEMBLY COMPRISING FILLER IMPROVING ION CONDUCTIVITY

(71) Applicants: Hyundai Motor Company, Seoul (KR); Kia Motors Corporation, Seoul (KR)

(72) Inventors: Il Seok Chae, Seoul (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 869 days.

(21) Appl. No.: 17/121,067

(22) Filed: Dec. 14, 2020

(65) Prior Publication Data

US 2022/0021012 A1    Jan. 20, 2022

(30) Foreign Application Priority Data

Jul. 20, 2020 (KR) .......... 10-2020-0089721

(51) Int. Cl.
| | | |
|---|---|---|
| H01M 8/1004 | (2016.01) | |
| C08J 5/22 | (2006.01) | |
| H01M 8/1044 | (2016.01) | |
| H01M 8/1069 | (2016.01) | |

(52) U.S. Cl.
CPC .......... *H01M 8/1004* (2013.01); *C08J 5/22* (2013.01); *H01M 8/1044* (2013.01); *H01M 8/1069* (2013.01); *H01M 2300/0082* (2013.01)

(58) Field of Classification Search
CPC .......... H01M 8/1048; H01M 8/1044
See application file for complete search history.

(56) References Cited

U.S. PATENT DOCUMENTS

2017/0037207 A1* 2/2017 Kunita .......... H01B 1/122

FOREIGN PATENT DOCUMENTS

| KR | 101306406 B1 | 9/2013 |
|---|---|---|
| KR | 101596876 B1 | 2/2016 |

OTHER PUBLICATIONS

H.R. Safaei et al., RSC Adv., 2015, 5, 6797.
W. Wu et al., Adv. Mater. 2018, 30, 1707516.
D. C. Lee et al., J. Membr. Sci. 2014, 452, 20.
Y. Li et al., J. Hydrogen Energy 2010, 35, 10560.
T. D. Gierke et al., J. Membr. Sci. 1983, 13, 307.

* cited by examiner

*Primary Examiner* — Nathanael T Zemui
(74) *Attorney, Agent, or Firm* — Fox Rothschild LLP

(57) ABSTRACT

Disclosed is an electrolyte membrane for a membrane-electrode assembly, which may include a filler that is a polymer compound (oligomer) having a low molecular weight. The electrolyte membrane may suitably include an oligomeric poly(vinylpyrrolidone) compound including a sulfonic acid group. The electrolyte membrane for a membrane-electrode assembly may have improved proton conductivity.

13 Claims, 2 Drawing Sheets

ELECTROLYTE MEMBRANE FOR MEMBRANE-ELECTRODE ASSEMBLY COMPRISING FILLER IMPROVING ION CONDUCTIVITY

CROSS REFERENCE TO RELATED APPLICATION

The present application claims priority based on Korean Patent Application No. 10-2020-0089721, filed on Jul. 20, 2020, the entire content of which is incorporated herein for all purposes by this reference.

TECHNICAL FIELD

The present invention relates to an electrolyte membrane for a membrane-electrode assembly including a filler to improve ion conductivity.

BACKGROUND

A proton-exchange membrane fuel cell (PEMFC) basically includes a fuel electrode (anode), an oxygen electrode (cathode) and a polymer electrolyte membrane disposed between two electrodes, and is referred to as a membrane-electrode assembly.

Hydrogen as a fuel is supplied to the anode, oxygen as an oxidizing agent is supplied to the cathode, and hydrogen supplied to the anode loses an electron and becomes a proton ($H^+$) and moves to the cathode through the polymer electrolyte membrane.

The electron generated from the hydrogen works electrically in the external circuit of the cell and reaches the cathode, and at the cathode, the proton combines with oxygen and the electron to produce water.

For example, the polymer electrolyte membrane may be Nafion, a representative ion-exchange membrane, plays a role in delivering the proton generated from the anode to the cathode, and serves as a diaphragm that prevents hydrogen, which is the fuel, from coming into direct contact with oxygen. As such, since the proton conduction relies on the exchange of protons through a sulfonic acid functional group (—$SO_3H$ group) in the presence of water, the hydration level of the polymer electrolyte membrane has to be optimally maintained.

Meanwhile, various inorganic fillers have been studied with the goal of improving proton-exchange characteristics, that is, of increasing proton conductivity. $TiO_2$, $TiSiO_4$, $SiO_2$, zeolite, graphene, graphene oxide, and the like are used as fillers for the Nafion membrane. Particularly, the inorganic filler is known to improve proton conductivity while maintaining membrane hydration in polymer inorganic composite membranes. However, since the size of the inorganic filler is generally 100 nm, it is 10 to 100 times greater than the chain length of the Nafion electrolyte membrane or the hydrated microstructure thereof. The use of an inorganic filler having such an inappropriate size may cause a problem of poor dispersion in the polymer electrolyte, and as a result, properties such as the mechanical strength of the electrolyte membrane may be deteriorated. Therefore, it is important to use a filler having an appropriate size suitable for the molecular microstructure of the electrolyte membrane.

SUMMARY

In preferred aspect, provided is an electrolyte membrane for a membrane-electrode assembly having improved proton conductivity.

Further provided is an electrolyte membrane for a membrane-electrode assembly, in which a filler is uniformly dispersed.

The objectives of the present invention are not limited to the foregoing, and will be able to be clearly understood through the following description and to be realized by the means described in the claims and combinations thereof.

In an aspect, provided is an electrolyte membrane for a membrane-electrode assembly, which may include: an ionomer including a perfluorinated sulfonic acid polymer; and a filler having a weight average molecular weight of about 10,000 g/mol or less and dispersed in the ionomer.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The term "filler" as used herein refers to a material added to a matrix or an admixture to improve properties but not to react or be reactive with any other compounds or chemicals in a surrounding matrix or admixture. The filler may be in a form of particles, fibers, or resin, and preferably, the filler may be particles.

In the electrolyte membrane, the filler may have a radius of hydration of about 5 nm or less.

In the electrolyte membrane, the filler may have a radius of hydration of about 2 nm or less.

In the electrolyte membrane, the weight average molecular weight of the filler may be about 5,000 g/mol or less.

The filler may include an oligomer including a repeating unit represented by Chemical Formula 1 below.

(M-B)A  [Chemical Formula 1]

Preferably, M may include one or more selected from the group consisting of

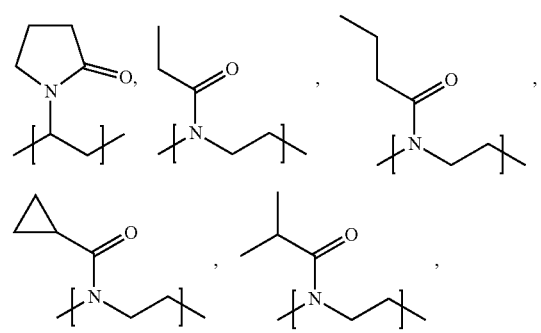

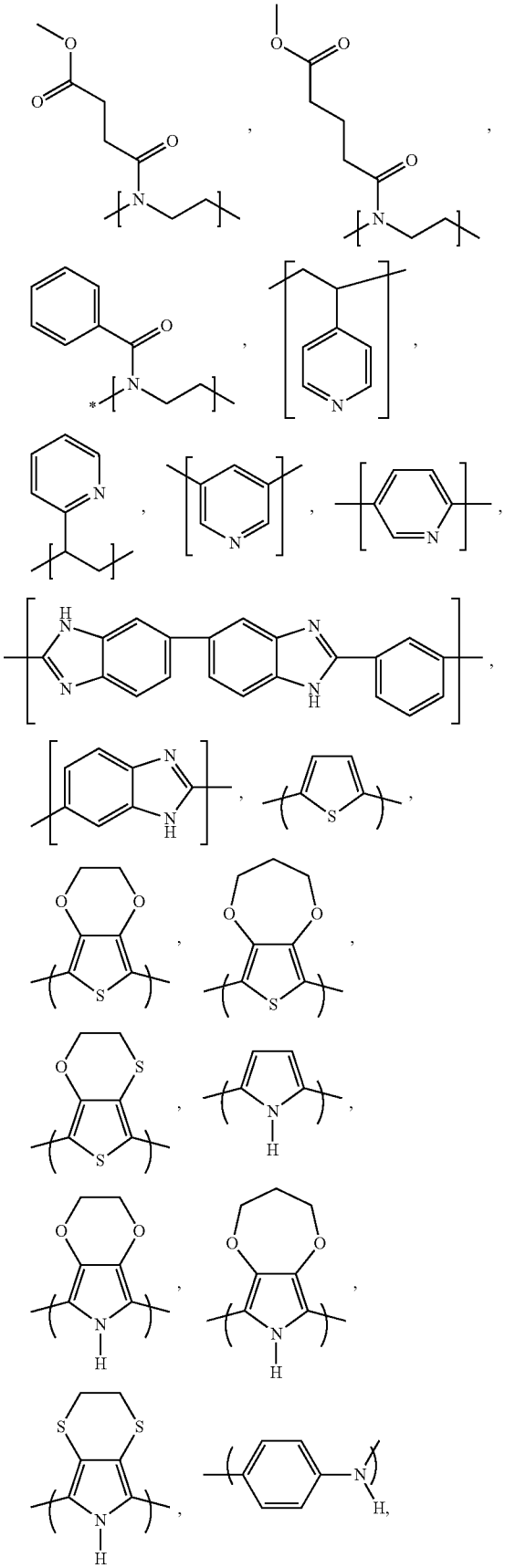

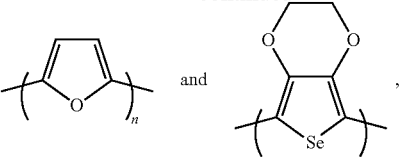

B may include one or more selected from hydrogen (H) and a sulfonic acid group ($SO_3H$), A may include one or more anions selected from the group consisting of $HSO_4^-$, $NO_3^-$, $PO_4^{3-}$, $Cl^-$, $BF_4^-$, $PF_6^-$, $CF_3SO_3^-$ and $C_2F_6NO_4S_2^-$, and M and B may be connected to each other through one or more atoms selected from the group consisting of oxygen (O), nitrogen (N) and sulfur (S) of M.

The filler may suitably include a poly(vinylpyrrolidone) (PVP) derivative.

The filler may suitably include an acid-doped oligomer.

The filler may suitably include an oligomer represented by Chemical Formula 1A below.

[Chemical Formula 1A]

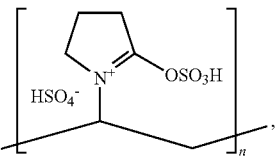

wherein n is a positive integer and suitably may be for example from 1 to 1000 or more, more typically about 5 or 10 to 100 to 500.

The filler may include an oligomer represented by Chemical Formula 1B below.

[Chemical Formula 1B]

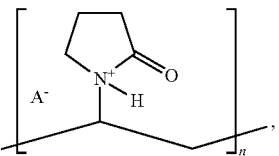

wherein n is a positive integer and suitably may be for example from 1 to 1000 or more, more typically about 5 or 10 to 100 to 500.

Here, A may include at least one anion selected from the group consisting of $HSO_4^-$, $NO_3^-$, $PO_4^{3-}$, $Cl^-$, $BF_4^-$, $PF_6^-$, $CF_3SO_3^-$ and $C_2F_6NO_4S_2^-$.

The filler may include at least one selected from the group consisting of compounds represented by Chemical Formula 2 to Chemical Formula 9 below.

[Chemical Formula 2]

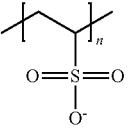

[Chemical Formula 3]

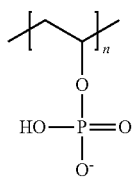

[Chemical Formula 4]

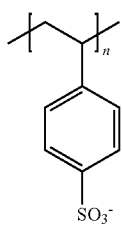

[Chemical Formula 5]

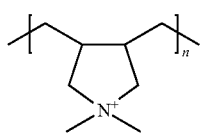

[Chemical Formula 6]

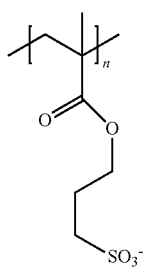

[Chemical Formula 7]

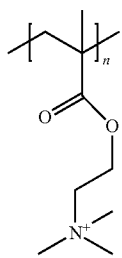

[Chemical Formula 8]

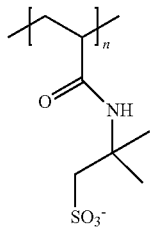

[Chemical Formula 9]

wherein in each of the above Formulae 2 through 9 n is the same or different positive integer and suitably may be for example from 1 to 1000 or more, more typically about 5 or 10 to 100 to 500.

In the electrolyte membrane, the amount of the filler may be about 1 wt % to 3 wt % based on the total weight of the electrolyte membrane.

In an aspect, provided is a method of manufacturing an electrolyte membrane for a membrane-electrode assembly, including: preparing an admixture solution including an ionomer including a perfluorinated sulfonic acid polymer and a filler as described herein, for example, having a weight average molecular weight of about 10,000 g/mol or less and dispersed in the ionomer; applying the admixture on a substrate; and heat-treating the applied product.

According to various exemplary embodiments of the present invention, an electrolyte membrane for a membrane-electrode assembly having improved proton conductivity may be obtained.

Further, according to various exemplary embodiments of the present invention, an electrolyte membrane for a membrane-electrode assembly, in which a filler is uniformly dispersed may be obtained.

Also provided are vehicles such as automobiles that comprise a fuel cell that comprises an assembly or an assembly as disclosed herein.

The effects of the present invention are not limited to the foregoing, and should be understood to include all effects that can be reasonably anticipated from the following description.

DETAILED DESCRIPTION

Figure 1A:
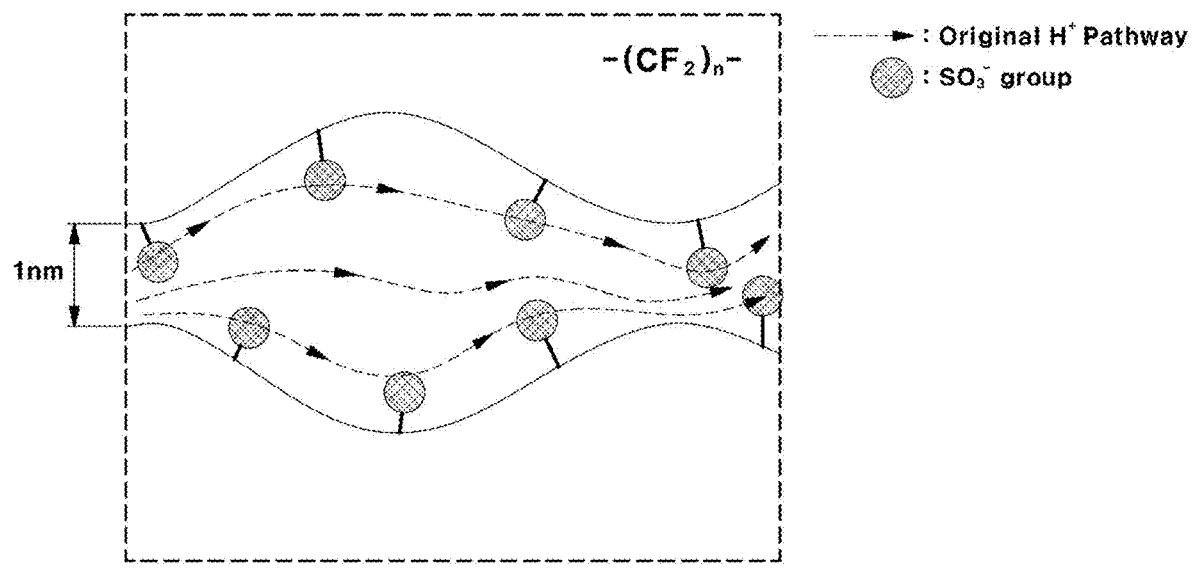
FIG. 1A shows a cluster-network model, which is a molecular microstructure of a hydrated ionomer in a conventional electrolyte membrane.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The electrolyte membrane for a membrane-electrode assembly may include an ionomer including a perfluorinated sulfonic acid polymer and a filler dispersed in the ionomer.

The ionomer may include a polymer having a proton-conductive functional group. The proton-conductive functional group may include sulfonic acid, sulfonate, carboxylic acid, carboxylate, phosphoric acid, phosphate, etc. In particular, the ionomer may include a perfluorinated sulfonic acid (PFSA) ionomer containing the proton-conductive functional group. For example, the ionomer may include Nafion.

Preferably, the proton conductivity of the electrolyte membrane may be improved by adding a filler to the ionomer.

For example, according to a cluster-network model, which is a molecular microstructure of the hydrated ionomer shown in FIG. 1A, water absorbed by the sulfonic acid group (—$SO_3^-$) of the ionomer forms a spherical cluster having a diameter of several nanometers, and a narrow channel of about 1 nm wide connecting a continuous cluster is formed.

Thus, when a filler having a diameter of about 100 nm, such as $TiO_2$, $TiSiO_4$, $SiO_2$, zeolite, graphene or graphene oxide, is used, as in the related art, it does not affect the cluster and/or channel, but rather may clump in the electrolyte membrane or deteriorate properties such as the mechanical strength of the electrolyte membrane.

Figure 1B:
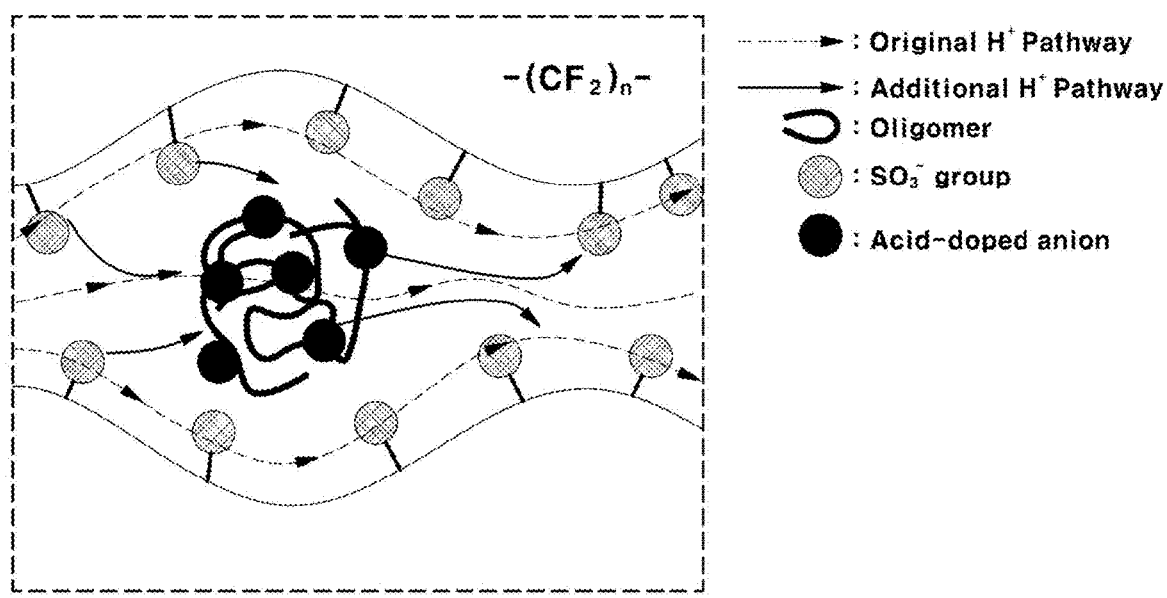
FIG. 1B shows an exemplary cluster-network model, which is a molecular microstructure of a hydrated ionomer and a filler in an electrolyte membrane according to an exemplary embodiment of the present invention.

Therefore, the present invention allows the ionomer and the filler to be mixed with each other at the molecular microstructure level, for example, by using a filler having a size suitable for the molecular microstructure of the hydrated ionomer, as shown in FIG. 1B.

Preferably, an acid-doped oligomer or an inherently proton-conductive oligomer may be used as the filler. Therefore, when the filler is inserted into the cluster of hydrated ionomers as shown in FIG. 1B, an additional proton pathway may be provided, so the proton conductivity of the electrolyte membrane may be improved.

The filler may have a radius of hydration of about 5 nm or less, or 2 nm or less. When the radius of hydration of the filler is greater than about 5 nm, it may not be mixed with the molecular microstructure of the hydrated ionomer. On the other hand, the lower limit of the radius of hydration of the filler is not particularly limited, and may be, for example, about 0.1 nm, about 0.5 nm, or about 1 nm.

The filler may have a weight average molecular weight of about 10,000 g/mol or less, about 5,000 g/mol or less, or about 2,500 g/mol or less. If the weight average molecular weight of the filler is greater than about 10,000 g/mol, the radius of hydration of the filler may substantially increase that the filler may not be mixed with the molecular microstructure of the hydrated ionomer. On the other hand, the lower limit of the weight average molecular weight of the filler is not particularly limited, and may be, for example, about 500 g/mol or about 1,000 g/mol.

The filler may include an acid-doped oligomer and/or a proton-conductive oligomer.

The acid-doped oligomer may be obtained by subjecting an oligomer having an unsaturated coordination site of nitrogen or sulfur to acid treatment. Particularly, the acid-doped oligomer may include an oligomer containing a repeating unit represented by Chemical Formula 1 below.

(M-B)A            [Chemical Formula 1]

M is a repeating unit of a polymer having an unsaturated coordination site of nitrogen or sulfur, which is the matrix of an acid-doped oligomer, and may preferably include one or more selected from the group consisting of

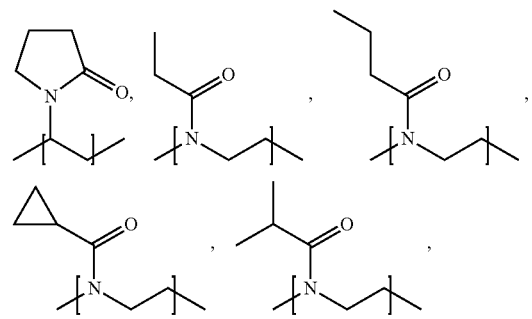

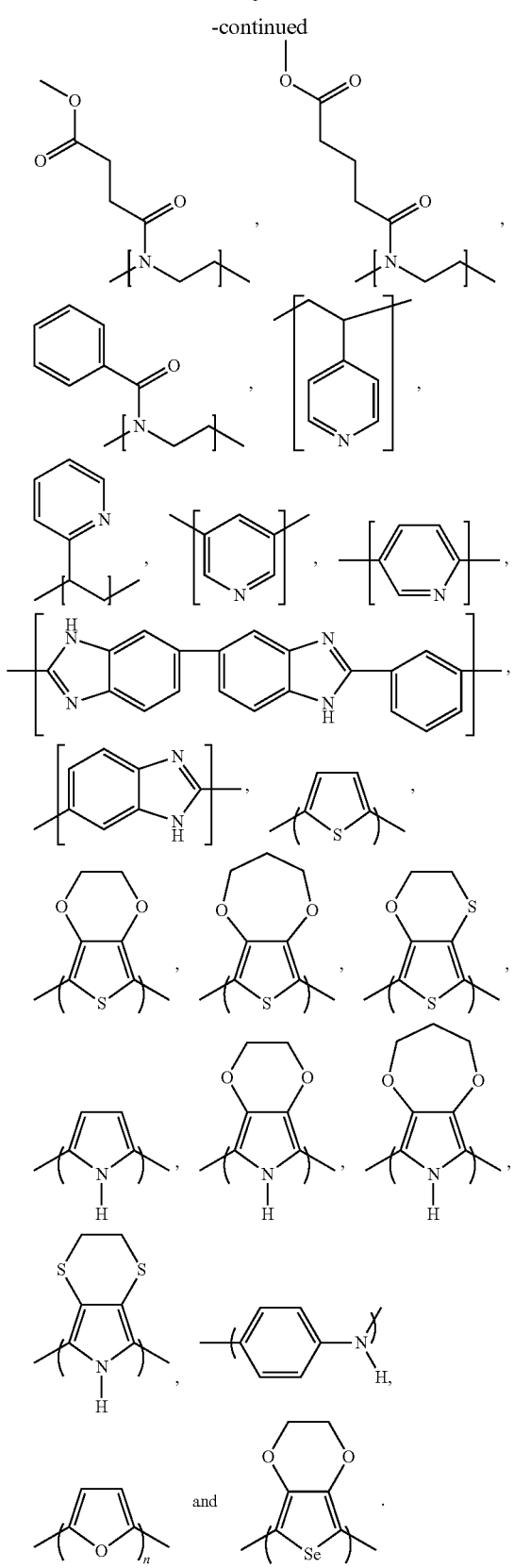

Also, B and A are those due to the acid that is used, and B may include one or more of hydrogen (H) and a sulfonic acid group ($SO_3H$), and A may include one or more anions selected from the group consisting of $HSO_4^-$, $NO_3^-$, $PO_4^{3-}$, $Cl^-$, $BF_4^-$, $PF_6^-$, $CF_3SO_3^-$ and $C_2F_6NO_4S_2^-$.

M and B may be connected to each other through one or more atoms selected from the group consisting of oxygen (O), nitrogen (N) and sulfur (S) of M.

More particularly, the acid-doped oligomer may include an oligomer represented by Chemical Formula 1A or Chemical Formula 1B below.

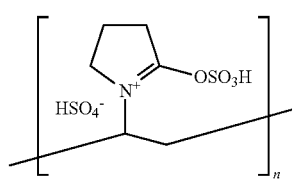

[Chemical Formula 1A]

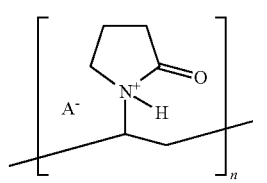

[Chemical Formula 1B]

In Chemical Formula 1A and Chemical Formula 1B, n may be a value appropriate for the weight average molecular weight of the above-described filler, and A of Chemical Formula 1B is as described above. Preferably, n is a positive integer and suitably may be for example from 1 to 1000 or more, more typically about 5 or 10 to 100 to 500.

The compounds of Chemical Formula 1A and Chemical Formula 1B may be oligomers obtained by treating poly (vinylpyrrolidone) (PVP), which is a polymer having an unsaturated coordination site of nitrogen or sulfur, with an acid.

The poly(vinylpyrrolidone) may be a biocompatible polymer, which is hygroscopic, is readily dissolved in water and alcohol, is non-toxic, and does not cause irritation. Poly (vinylpyrrolidone) may have the polarity of amide (RC(=O)NR'R"). For example, poly(vinylpyrrolidone) has high compatibility with other polar polymers, and thus may be widely used as an additive.

The results of measurement of the radius of hydration of poly(vinylpyrrolidone) depending on the weight average molecular weight thereof through dynamic light scattering (DLS) and gel permeation chromatography (GPC), and also, the results of measurement of the radius of gyration (Rg) of the polymer chain of poly(vinylpyrrolidone) using a multi-angle light scattering (MALS) device, are shown in Table 1 below.

TABLE 1

| PVP weight average molecular weight | Radius of hydration [nm] | | Radius of gyration[1] |
|---|---|---|---|
| [g/mol] | DLS | GPC | [nm] |
| 2,500 | 2 | —[2] | —[2] |
| 5,000 | 3 | 2 | —[2] |
| 10,000 | 5 | 4 | 6 |
| 40,000 | 8 | 6 | 10 |

[1]Using 18 angles;
[2]Not measured because particles too small

Considering the diameter of the hydrated cluster of the ionomer, it may be desirable to prepare a filler through acid treatment of poly(vinylpyrrolidone) having a weight average molecular weight of about 10,000 g/mol or less.

The reaction route to obtain the oligomer represented by Chemical Formula 1A by acid-treating poly(vinylpyrrolidone) is as follows.

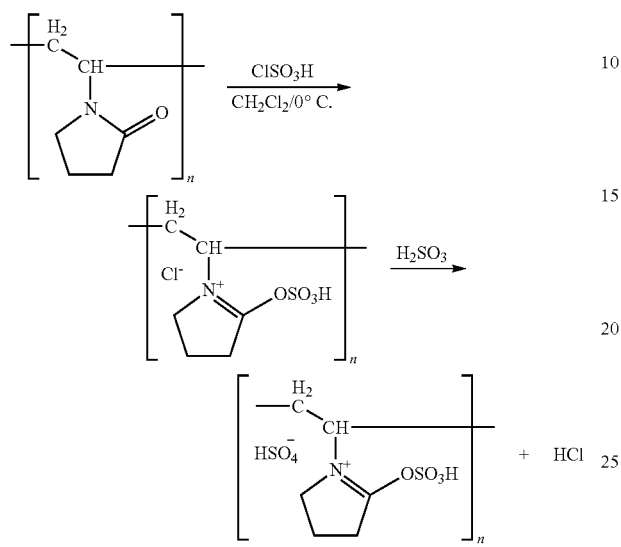

The reaction route to obtain the oligomer represented by Chemical Formula 1B by acid-treating poly(vinylpyrrolidone) is as follows.

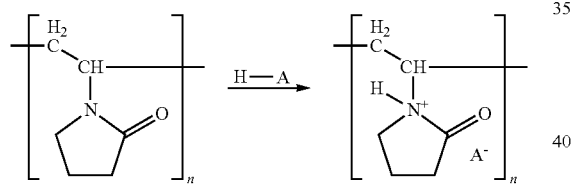

For example, a PVP aqueous solution is added with an acid, such as sulfuric acid, nitric acid, phosphoric acid, hydrochloric acid, $HBF_4$, $HPF_6$, $HCF_3SO_3$, $HC_2F_6NO_4S_2$ or the like, and stirred, followed by precipitation using an acetone solvent or the like and then centrifugation to afford a gel-like product. The product thus obtained is dried in an oven, thereby yielding the oligomer represented by Chemical Formula 1B.

The filler may suitably include an inherently proton-conductive oligomer.

The proton-conductive oligomer may suitably include one or more selected from the group consisting of compounds represented by Chemical Formula 2 to Chemical Formula 9 below.

[Chemical Formula 2]

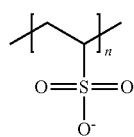

[Chemical Formula 3]

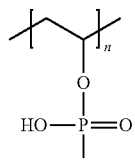

[Chemical Formula 4]

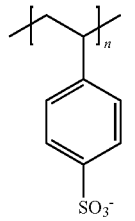

[Chemical Formula 5]

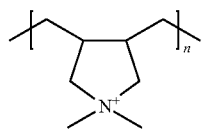

[Chemical Formula 6]

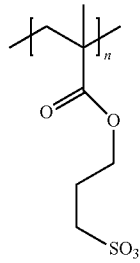

[Chemical Formula 7]

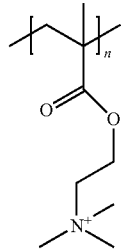

[Chemical Formula 8]

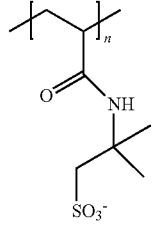

[Chemical Formula 9]

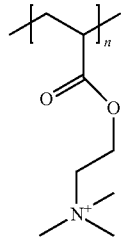

n is a positive integer and suitably may be for example from 1 to 1000 or more, more typically about 5 or 10 to 100 to 500.

The amount of the filler may be about 1 wt % to 5 wt % or 1 wt % to 3 wt % based on the total weight of the electrolyte membrane. When the amount thereof is less than about 1 wt %, the effect of improving proton conductivity may become insignificant, whereas when the amount thereof is greater than about 5 wt %, dispersibility of the filler in the ionomer may be reduced.

Figure 2:
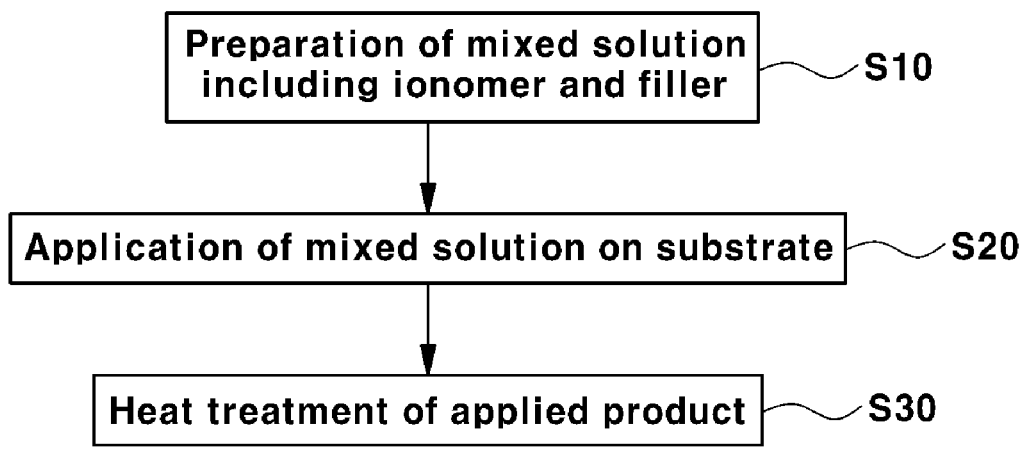
FIG. 2 shows an exemplary process of manufacturing an exemplary electrolyte membrane according to an exemplary embodiment of the present invention.

FIG. 2 shows an exemplary process of manufacturing an exemplary electrolyte membrane for an exemplary membrane-electrode assembly according to an exemplary embodiment of the present invention. With reference thereto, the method of the present invention includes preparing an admixture including an ionomer including a perfluorinated sulfonic acid polymer and a filler (S10), applying the admixture on a substrate such as a release paper or the like (S20), and heat-treating the applied product (S30).

The ionomer and the filler are as described above, and thus a detailed description thereof is omitted.

The process of applying the admixture is not particularly limited. Examples thereof may include a screen-printing process, a spray-coating process, a coating process using a doctor blade, a gravure-coating process, a dip-coating process, a silkscreen process, a painting process, and a coating process using a slot die.

After applying the admixture on the substrate, the method may further include performing drying. Drying may be performed at a temperature of about 100° C. or less for about 30 min or greater. When the drying temperature is greater than about 100° C., the ionomer may be thermally decomposed. Meanwhile, when the drying time is less than about 30 min, drying may not be performed properly.

The heat treatment may be performed at a temperature of about 110° C. or greater for about 20 min or less. When the heat treatment time is too long, the ionomer may be thermally decomposed.

EXAMPLE

A better understanding of the present invention will be given through the following examples, which are merely set forth to illustrate the present invention but are not to be construed as limiting the scope of the present invention.

Preparation Example 1

An acid-doped oligomer represented by Chemical Formula 1A was prepared by subjecting poly(vinylpyrrolidone) having a weight average molecular weight of 2,500 g/mol to acid treatment according to a method disclosed in H. R Safaei et al., RSC Adv., 2015, 5, 6797.

Preparation Example 2

An aqueous solution having 10 wt % of poly(vinylpyrrolidone) having a weight average molecular weight of 2,500 g/mol was prepared. The aqueous solution was placed in an ice bath, and a sulfuric-acid-diluted aqueous solution containing 50 wt % of sulfuric acid was added dropwise to the aqueous solution and stirred, followed by precipitation using an acetone solvent and then centrifugation to afford a gel-like product. The product thus obtained was dried in a vacuum oven for about 12 hr, thereby yielding an acid-doped oligomer represented by Chemical Formula 1B (in which A is $HSO_4^-$).

Example 1

Nafion was used as an ionomer, and the acid-doped oligomer obtained in Preparation Example 1 was used as a filler.

An admixture of the ionomer and the filler was prepared, in which the amount of the filler was 1 wt %, 3 wt % and 5 wt % based on the total weight of the admixture.

The admixture was applied to one side of a release paper, dried, and heat-treated, thereby manufacturing an electrolyte membrane.

Example 2

An electrolyte membrane was manufactured in the same manner as in Example 1, with the exception that the acid-doped oligomer obtained in Preparation Example 2 was used as the filler.

Comparative Example

An electrolyte membrane was manufactured in the same manner as in Example 1, with the exception that poly(vinylpyrrolidone) (weight average molecular weight: 2,500 g/mol) not subjected to acid treatment was used as the filler.

Test Example—Measurement of Proton Conductivity

The proton conductivity of the electrolyte membranes of Example 1, Example 2 and Comparative Example was measured. Specifically, proton conductivity was measured under conditions at a temperature of about 80° C. and about 50% relative humidity in the in-plane direction of the electrolyte membrane. The results thereof are shown in Table 2 below.

TABLE 2

| Amount of filler | Electrolyte membrane thickness [μm] | Proton conductivity [mS/cm] | | |
|---|---|---|---|---|
| | | Comparative Example | Example 1 | Example 2 |
| 0 wt %[1)] | 21 | | 36.7 | |
| 1 wt % | 17 | 25.1 | 43.9 | 42.2 |
| 3 wt % | 19 | 18.6 | 45.2 | 46.9 |
| 5 wt % | 20 | 17.3 | 37.1 | 32.2 |

[1)]Electrolyte membrane not added with filler

With reference to Table 2, in Comparative Example, it can be seen that the filler acts as a material that interferes with proton conduction, and thus proton conductivity decreases with an increase in the amount of the filler.

As is apparent from the results of Example 1 and Example 2 using the acid-doped oligomer as the filler, there was no great difference therebetween. Moreover, in Example 1 and Example 2, the proton conductivity was increased by a maximum of about 10 mS/cm compared to the case of the electrolyte membrane not added with the filler, and was increased by a maximum of about 30 mS/cm compared to Comparative Example.

The present invention has been described in detail herein above with respect to test examples and various exemplary embodiments. However, the scope of the present invention is not limited to the aforementioned test examples and examples, and various modifications and improved modes of the present invention using the basic concept of the present invention defined in the accompanying claims are also incorporated in the scope of the present invention.

What is claimed is:

1. An electrolyte membrane for a membrane-electrode assembly, comprising:
    an ionomer comprising a perfluorinated sulfonic acid polymer; and
    a filler having a weight average molecular weight of about 10,000 g/mol or less and dispersed in the ionomer,
    wherein the filler has a radius of hydration of about 5 nm or less,
    wherein the filler comprises an acid-doped oligomer, and
    wherein the filler is inserted into a cluster of hydrated ionomers.

2. The electrolyte membrane of claim 1, wherein the filler has a radius of hydration of about 2 nm or less.

3. The electrolyte membrane of claim 1, wherein the weight average molecular weight of the filler is about 5,000 g/mol or less.

4. The electrolyte membrane of claim 1, wherein the filler comprises an oligomer comprising a repeating unit represented by Chemical Formula 1 below:

(M-B)A        [Chemical Formula 1]

wherein M comprises one or more selected from the group consisting of

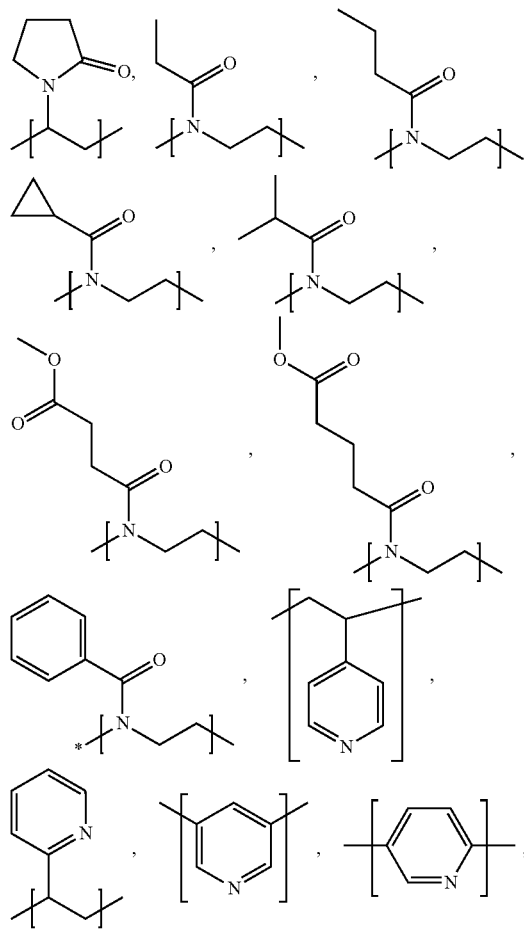

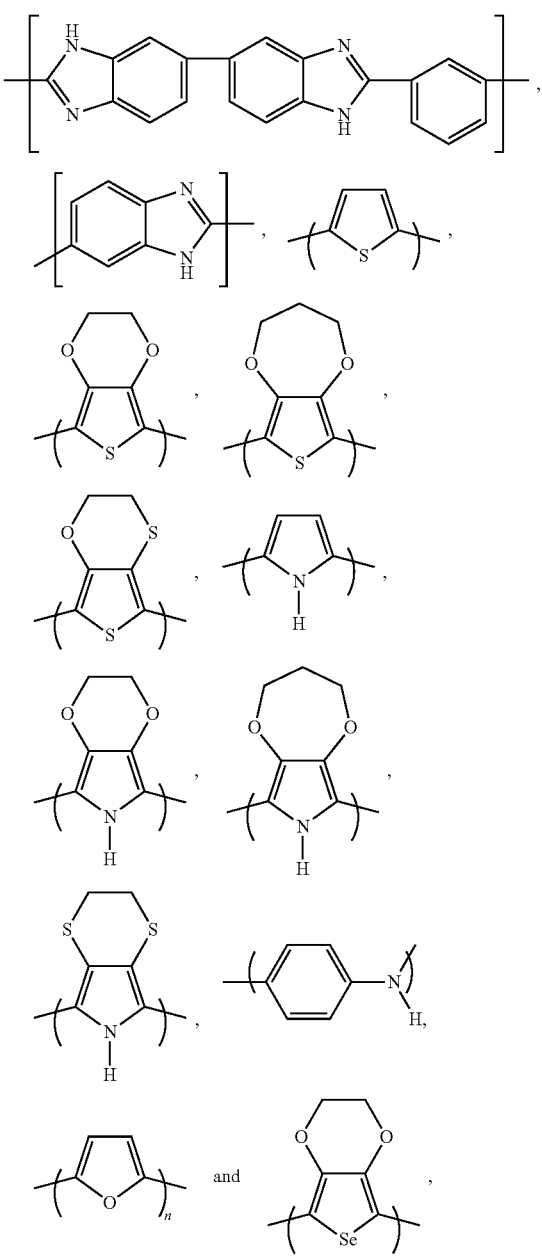

B comprises one or more selected from hydrogen (H) and a sulfonic acid group ($SO_3H$), A comprises one or more anions selected from the group consisting of $HSO_4^-$, $NO_3^-$, $PO_4^{3-}$, $Cl^-$, $BF_4^-$, $PF_6^-$, $CF_3SO_3^-$ and $C_2F_6NO_4S_2^-$, and M and B are connected to each other through one or more atoms selected from oxygen (O), nitrogen (N) or sulfur (S) of M.

5. The electrolyte membrane of claim 1, wherein the filler comprises a poly(vinylpyrrolidone) (PVP) derivative.

6. The electrolyte membrane of claim 1, wherein the filler comprises an oligomer represented by Chemical Formula 1A below,

[Chemical Formula 1A]

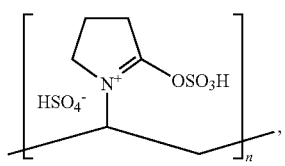

wherein n is a positive integer.

7. The electrolyte membrane of claim 1, wherein the filler comprises an oligomer represented by Chemical Formula 1B below:

[Chemical Formula 1B]

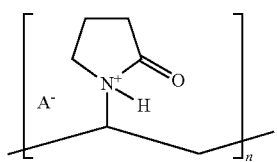

wherein A comprises one or more anions selected from the group consisting of $HSO_4^-$, $NO_3^-$, $PO_4^{3-}$, $Cl^-$, $BF_4^-$, $PF_6^-$, $CF_3SO_3^-$ and $C_2F_6NO_4S_2^-$; and n is a positive integer.

8. The electrolyte membrane of claim 1, wherein the filler comprises one or more selected from the group consisting of compounds represented by Chemical Formula 2 to Chemical Formula 9 below,

[Chemical Formula 2]

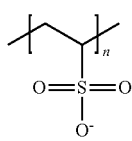

[Chemical Formula 3]

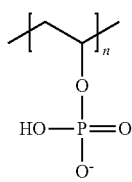

[Chemical Formula 4]

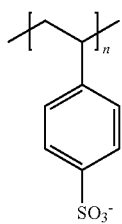

[Chemical Formula 5]

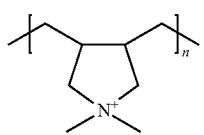

[Chemical Formula 6]

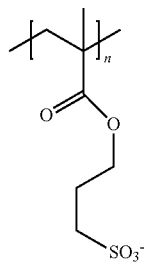

[Chemical Formula 7]

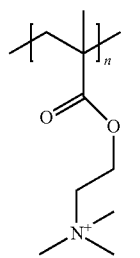

[Chemical Formula 8]

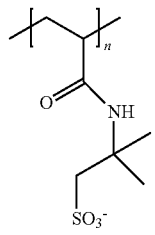

[Chemical Formula 9]

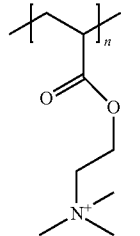

wherein in each of Formulae 2 through 9 n is a positive integer.

9. The electrolyte membrane of claim 1, wherein the electrolyte membrane comprises the filler in an amount of about 1 wt % to 3 wt % based on the total weight of the electrolyte membrane.

10. A method of manufacturing an electrolyte membrane for a membrane-electrode assembly, comprising:
preparing an admixture comprising an ionomer comprising a perfluorinated sulfonic acid polymer and a filler having a weight average molecular weight of about 10,000 g/mol or less and dispersed in the ionomer;
applying the admixture on a substrate; and
heat-treating an applied product,
wherein the filler has a radius of hydration of about 5 nm or less,
wherein the filler comprises an acid-doped oligomer, and
wherein the filler is inserted into a cluster of hydrated ionomers.

11. A membrane-electrode assembly, comprising:
an electrolyte membrane of claim 1;
a cathode formed on one side of the electrolyte membrane; and
an anode formed on a remaining side of the electrolyte membrane.

12. A fuel cell comprising an assembly of claim 11.
13. A vehicle comprising a fuel cell of claim 12.

\* \* \* \* \*